United States Patent Office 3,174,956
Patented Mar. 23, 1965

3,174,956
NEW METHOD OF POLYMERIZING ACETYLENE
Lionel B. Luttinger, Stamford, Conn., assignor to American Cyanamid Company, New York, N.Y., a corporation of Maine
No Drawing. Filed Dec. 7, 1959, Ser. No. 857,496
11 Claims. (Cl. 260—88.1)

This invention relates to a new and efficient method for polymerizing and copolymerizing acetylene. More particularly, this invention relates to the polymerization and copolymerization of acetylene with monosubstituted acetylene using a catalyst composition comprising a mixture of (1) a simple metal salt represented by the general formula (I) $M_nX_m$ wherein $m$ is an integer of from 1 to 3, inclusive, $n$ is an integer of from 1 to 2, inclusive, M is a metal selected from the class consisting of nickel, cobalt, palladium, platinum, rhodium, iridium, ruthenium and osmium, X represents any inorganic anion having a valence of from 1 to 6, inclusive, such as fluoride, chloride, bromide, iodide, phosphate, sulfate, ferrocyanide, sulfonate, chloroplatinate, hydroxide, sulfite, bisulfite, nitrate, silicate, borate, carbonate, arsenate, benzenesulfonate, chloropalladate, fluosilicate, and (2) a metal hydride having at least one hydridic hydrogen and no metal-to-carbon bonds. Briefly the present invention comprises forming a mixture of the transition metal salt with the metal hydride in a solvent either alone or in the presence of acetylene.

The instant invention relates to a new method for the polymerization of acetylene and mixtures of acetylene with at least 5 percent by weight of the mixture of at least one mono-substituted acetylene represented by the general formula (II) $RC \equiv CH$ where R represents a member of the class consisting of alkyl, aryl, aralkyl, alkaryl, hydroxy-substituted alkyl, halo-substituted alkyl, hydroxy-substituted aryl, halo-substituted aryl, amino-substituted alkyl, alkoxy, aryloxy, mercaptyl, vinyl, allyl, cyanoalkyl, alkanoyl, carboxy, and alkanoyloxy.

Components of the catalyst system, namely, the transition metal salt and the metal hydride, are operative in an extensive range of weight proportions which may be, for example, from about 1 to 50 to 50 to 1, or over even a wider range depending, for instance, upon the conditions of the reaction. In some instances a minuscule amount of one of the components with a large amount of the other may be operative at elevated temperatures. An important feature in the process is that the components must exhibit a slight solubility in the reaction mixture in order to obtain an interaction which is necessary to promote the catalysis. The particular solvent is chosen with this in mind. The polymerizations and copolymerizations have been found to proceed efficiently in polar solvents such as water and alcohols, in less polar solvents such as dibetamethoxy-ether (diglyme), tetrahydrofuran, and acetonitrile, and in some cases in non-polar solvents such as benzene and heptane.

It is rather surprising and unexpected that polymerization of acetylene with which this invention is concerned takes place in the presence of a mixture of the above transition metal salts and metal hydrides since neither of the catalyst components are operative by themselves to perform the polymerization. In other such catalyst systems which employ a mixture of two or more components, the nature of the solvent is critical or the nature of the catalyst system is sensitive to certain impurities such as water and oxygen. In French Patent 1,173,592 there are disclosed metal alkyl hydrogen-substituted compounds which are both oxygen and water sensitive. It is a unique and novel feature of this invention that no care need be taken to eliminate oxygen. In fact, oxygen may be bubbled through the system without manifestly inhibiting the reaction. Furthermore, it is very advantageous that water may be used as a solvent since it is inexpensive and produces no fire hazard.

The compounds which are used in conjunction with the transition metal salts are selected from compounds containing a hydridic hydrogen associated with metal. The term hydridic is used in the customary sense [see J. H. Smalley and S. F. Stafiej, J. Am. Chem. Soc. 81, 582 (1959)] as meaning a hydrogen atom attached to some other atom by a bond (covalent or ionic) which is polarized so that the hydrogen atom is negatively charged (hydridic) as opposed to positively charged (acidic). [See D. T. Hurd, An Introduction to the Chemistry of the Hydrides (John Wiley & Sons, Inc., New York, 1952), pp. 24–26, 56–59.]

Compounds containing hydridic hydrogen bonds may be selected from one of the following categories:

(1) Simple known hydrides of Groups I to III of the Periodic System, such as LiH, $B_2H_6$, etc.
(2) Complex hydrides of Group III, such as $NaBH_4$, $LiAlH_4$, $KGaH_4$, etc.
(3) Simple and complex hydrides of Si, Ge, Sn such as $SiH_4$, $Si_3H_8$, $SnH_4$, etc.
(4) Hydrides from categories (1), (2), and (3) in which one or more, but not all, of the hydridic-hydrogens have been replaced by halogens, hydroxy groups, or other groups which do not give rise to a metal-carbon bond.

The hydrides of the Group III elements such as sodium borohydride, lithium aluminum hydride and diborane have been found to be more effective than the simple hydrides of other metals. When these reducing agents are used with the transition metal salts, acetylene can be polymerized at room temperature (20°–30° C.) and with higher yields than when the other hydrides are used. The borohydrides, in particular, are advantageously employed since they are operative in a large variety of solvents and are easily obtained commercially.

Many of the metal hydrides are available commercially or are easily prepared. For example, the alkali and alkaline-earth metals react with hydrogen in an atmosphere of that gas. Reference is made to Gaylord's Reduction With Complex Metal Hydrides, Interscience Publishers, New York, 1956.

The alkali-metal borohydrides, especially $LiBH_4$, $KBH_4$, and $NaBH_4$, are well-known compounds. They may be obtained commercially or prepared according to the equation, (III) 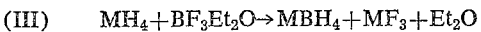

or by the method disclosed in U.S. Patent No. 2,880,058 to Bronaugh according to the equation, (IV) 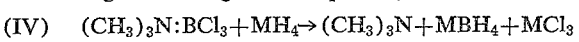

The alkali-metal aluminum hydrides and borohydrides are well-known and are easily obtained commercially.

The transition metal salts embraced by Formula I are salts of metals of Group VIII of the Periodic Chart.

These salts include the simple salts such as $NiCl_2$, $CoBr_2$, $Pd(NO_3)_2$, $PtCl_2$, $Ru(SCN)_2$, $OsCl_2$, $IrI_2$, $RhCl_3$ and the like.

Applicant has found that the inorganic anion represented by X in the transition metal salt of Formula I is not critical and may vary considerably. The only property it must have is that it be able to take part in the formation of a salt with the particular metal with which it is to be used. These include all inorganic anions having valences from 1 to 3, inclusive. The valence is not critical since both monovalent radicals such as chloride and trivalent radicals such as phosphate are operative.

The source of these metal salts is for the most part commercial. However, their preparation may be performed very simply through the combination of the appropriate acid and base or through other straightforward chemical procedures which are well-known to those well skilled in the art.

In order that those skilled in the art may better understand how the present invention can be carried into effect, the following examples are given by way of illustration and not by way of limitation. All parts and percentages are by weight unless otherwise stated.

EXAMPLE 1

Acetylene is continuously bubbled into 100 cc. of ethanol. 1.0 g. $NaBH_4$ is added. After mixing, 0.7 g. $Co(NO_3)_2 \cdot 6H_2O$ is added. After four hours, the reaction is stopped. A solid, almost black material is obtained, as well as a yellow solution. The solid is extracted with benzene, petroleum ether, acetone, and water, and finally dried.

IR showed strong band at 1015 cm.$^{-1}$.

EXAMPLE 2

To a stirred flask held at 35° C. and containing 700 ml. of absolute ethanol which had been saturated with acetylene was added rapidly and consecutively 2.83 grams (0.075 mole) of sodium borohydride and 3.57 grams (0.015 mole) of nickelous chloride hexahydrate. A rapid reaction occurred resulting in the formation of a black suspension in the reaction vessel. The flow of acetylene at a rate of 0.8 mole/hr. was continued for three hours. The system was then swept free of acetylene with nitrogen and the product collected on a filter. The product was purified by successive washings with hexane, methanol, a 5% hydrogen chloride in methanol solution, water and acetone. The product was a linear high polymer, the IR of which showed a strong band at 1015 cm.$^{-1}$.

The following tables include further examples of experiments which were conducted according to the procedure outlined above; Table I contains experiments producing homopolymeric acetylene and Table II discloses copolymers of acetylene with mono-substituted acetylenes.

In each of the following experiments, the solvent was kept saturated with acetylene at atmospheric pressure. The products were polymers of acetylene in every case.

*Table I*

| Ex. No. | Metal Hydride, Parts | | Metal Salt, Parts | | Solvent, Parts | | Temp. and Time of Experiment |
|---|---|---|---|---|---|---|---|
| 3 | $NaBH_4$ | 2.83 | $NiCl_2$ | 3.57 | Heptane | 973 | 35° C./1 hr. |
| 4 | $NaBH_4$ | 2.83 | $NiCl_2$ | 3.57 | Acetonitrile | 1,138 | 35° C./1 hr. |
| 5 | $NaBH_4$ | 2.83 | $NiCl_2$ | 3.57 | Water | 700 | 35° C./1 hr. |
| 6 | $NaBH_4$ | 2.83 | $NiCl_2$ | 3.57 | Xylene | 126 | 35 °C./1 hr. |
| 7 | $NaBH_4$ | 2.83 | $NiCl_2$ | 3.57 | Tetrahydrofuran | 700 | 35° C./1 hr. |
| 8 | $NaBH_4$ | 2.83 | $NiCl_2$ | 3.57 | Ethyl Ether | 1,188 | 35° C./1 hr. |
| 9 | $NaBH_4$ | 2.83 | $NiCl_2$ | 3.57 | Dioxane | 1,938 | 35° C./1 hr. |
| 10 | $NaBH_4$ | 2.83 | $NiCl_2$ | 3.57 | Ethyl Acetate | 1,835 | 35° C./1 hr. |
| 11 | $NaBH_4$ | 2.83 | $NiCl_2$ | 3.57 | Tetrahydrofuran | 700 | 0° C./1 hr. |
| 12 | $NaBH_4$ | 2.83 | $NiCl_2$ | 3.57 | ----do---- | 700 | 65° C./1 hr. |
| 13 | $NaBH_4$ | 0.56 | $NiCl_2$ | 3.57 | ----do---- | 700 | 0° C./1 hr. |
| 14 | $NaBH_4$ | 1.70 | $NiCl_2$ | 3.57 | ----do---- | 700 | 0° C./1 hr. |
| 15 | $NaBH_4$ | 2.83 | $NiCl_2$ | 3.57 | Dimethyl Formamide | 900 | 35° C./1 hr. |
| 16 | $NaBH_4$ | 3.23 | $NiCl_2$ | 3.57 | Tetrahydrofuran | 700 | 0° C./1 hr. |
| 17 | $NaBH_4$ | 2.83 | $NiCl_2$ | 10.70 | ----do---- | 700 | 0° C./1 hr. |
| 18 | $NaBH_4$ | 2.83 | $NiCl_2$ | 17.85 | ----do---- | 700 | 0° C./1 hr. |
| 19 | $NaBH_4$ | 2.83 | $NiCl_2$ | 35.70 | ----do---- | 700 | 0° C./1 hr. |

*Table II*

| Ex. No. | Acetylenes Polymerized | Concentration of Acetylenes | Metal Hydride, Parts | | Metal Salt, Parts | | Solvent, Parts | | Temp. °C and Time of Experiment | Products |
|---|---|---|---|---|---|---|---|---|---|---|
| 20 | Acetylene and Propyne. | Solvent maintained saturated with acetylene at atmos. solvent also maint. saturated with propyne. | $NaBH_4$ | 2.8 | $NiCl_2$ | 3.6 | Tetrahydrofuran | 850 | 25°/6 hrs. | Homopolymers and Copolymers. |
| 21 | Acetylene and Butyne-1. | (Same as Above) | $NaBH_4$ | 2.8 | $NiBr_2$ | 4.4 | ----do---- | 850 | 25°/6 hrs. | Do. |
| 22 | Acetylene and Heptyne-1. | Solvent maint. saturated with acetylene. Heptyne, 105 parts. | $NaBH_4$ | 2.4 | $CoCl_2$ | 3.2 | ----do---- | 850 | 25°/5 hrs. | Do. |
| 23 | Acetylene and Propyne. | Solvent maint. saturated with both acetylenes. | $B_2H_6$ | 2.1 | $PtCl_4$ | 4.1 | Acetonitrile and Tetrahydrofuran. | 1,150 / 150 | 35°/5 hrs. | Do. |
| 24 | Acetylene and Phenyl Acetylene. | Solvent maint. saturated with acetylene. Phenyl acetylene, 115 parts. | $SiH_4$ | 2.0 | $Pd(NO_3)_2$ | 3.8 | Ethanol | 1,220 | 40°/5 hrs. | Do. |
| 25 | Acetylene and Propargyl Alcohol. | Solvent maint. saturated with acetylene. Propargyl alcohol, 105 parts. | $KBH_4$ | 2.9 | $RuCl_3$ | 3.6 | Dioxane and Ethanol. | 2,000 / 1,000 | 35°/4 hrs. | Do. |
| 26 | Acetylene and Propyne. | Solvent maint. saturated with both acetylenes. | $LiAlH_4$ | 2.9 | $OsCl_3$ | 4.4 | Tetrahydrofuran | 1,200 | 35°/4 hrs. | Do. |
| 27 | Acetylene and Heptyne-1. | Solvent maint. saturated with acetylene. Heptyne-1, 165 parts. | $LiH$ | 2.9 | $RhCl_3$ | 3.6 | ----do---- | 1,200 | 35°/6 hrs. | Do. |

Certain of the polymers prepared by the present invention may be used as drying oils for varnishes, enamels and paints. This is true of certain of the copolymers of acetylene and monosubstituted acetylenes, as well as of low molecular weight homopolymers of acetylene itself. The latter homopolymers may also have utility as coloring materials, as well as intermediates in the preparation of carotenoid and terpenoid materials. Various of these low molecular weight polymers and copolymers may be useful, by their very nature, as ultraviolet light absorbers, antioxidants and intermediates for making polyalcohols, polymethoxides, methoxy resins, etc. Moreover, merely by total hydrogenation they become saturated aliphatic compounds or by partial hydrogenation one can obtain products that contain both saturated and unsaturated bonds between adjacent carbon atoms, and which have intermediate properties. The invention is further applicable to all copolymers formed from unconjugated diacetylenes and acetylene itself.

The insoluble, high molecular weight polyacetylene has useful properties as an adsorbent and as a filler in rubber compositions.

The structures of the polymers herein disclosed have been determined by infrared and ultraviolet spectrophotometry, by mass spectrography, X-ray diffraction, vapor-phase chromatography, and in some cases in combination with elemental analysis. The high molecular weight polyacetylene is insoluble in the common solvents, and is black and stable in almost any medium. The presence of low molecular weight polyenes (low molecular weight acetylene polymers) is best shown by the U.V. spectra. These show absorption maxima at, e.g., 328 m$\mu$, 347 m$\mu$, 377 m$\mu$, etc., and further peaks, indicating sequences of conjugated double bonds ranging up to about twelve in number. These conjugated polymer structures are also supported by infrared and mass spectrometric analysis, as well as by vapor-phase chromatography.

Copolymerization of acetylene with mono-substituted acetylenes is demonstrated by mass spectroscopy by vapor-phase chromatography, by hydrogenation to known paraffins, and by the presence of characteristic infrared bands in the products (e.g., at 970–980 cm.$^{-1}$, and at 890–900 cm.$^{-1}$ in the case of copolymers of acetylene with propyne and with heptyne-1).

The molecular weight of high polymeric polyacetylene is well above 10,000, but may range from 5,000 to 20,000. The low polymers of acetylene itself as well as most of the copolymers formed have molecular weights corresponding to from two to perhaps twenty monomer units.

The structures of the lower polymers and copolymers have, as mentioned above, been determined primarily by comparing their mass spectra with their infrared and ultraviolet spectra, as well as by vapor-phase chromatography. These products had parent peaks in their mass spectra which corresponded to their molecular weight. The formation of low molecular weight polymers, largely polymers having up to about twelve conjugated double bonds per polymer chain, was determined by these means.

The relative quantities of the various species formed in the copolymerization of acetylene with mono-substituted acetylenes, could usually be determined by mass spectroscopy, infrared and ultraviolet spectroscopy, and vapour-phase chromatography.

The catalyst system at hand, therefore, brings about the conversion of acetylene into (1) an insoluble high polymer, and (2) low polymers, largely conjugated polymers, which contain from two to about twelve double bonds per molecule.

I claim:
1. A method of polymerizing a polymerizable material selected from the class consisting of (a) acetylene and (b) a mixture consisting essentially of acetylene and at least 5% by weight of the mixture of at least 1 monosubstituted acetylene selected from the group consisting of propyne, butyne-1, heptyne-1, phenyl-acetylene and propargyl alcohol, by reacting said polymerizable material at a temperature between about 0° C. and 65° C. in a solvent for said polymerizable material and in the presence of a catalyst composition comprising a mixture of (1) a transition metal inorganic salt composed of a metal selected from the group consisting of nickel, cobalt, palladium, platinum, rhodium, iridium, ruthenium and osmium with an inorganic anion selected from the group consisting of fluoride, chloride, bromide, iodide, phosphate, sulfate, ferrocyanide, sulfonate, sulfite, bisulfite, nitrate, silicate, borate, carbonate, arsenate and fluosilicate and (2) a metal hydride having at least 1 hydridic hydrogen and no metal-to-carbon bond and being selected from the group consisting of simple hydrides of metals of Groups I–III of the periodic system, complex hydrides of metals of Group III of the periodic system and simple hydrides of silicon wherein the components of the catalyst system exhibit at least a slight solubility in the reaction mixture.

2. A method such as set forth in claim 1 wherein the catalyst comprises a mixture of $NiCl_2$ and $NaBH_4$.

3. A method such as set forth in claim 1 wherein the catalyst comprises a mixture of $NiBr_2$ and $LiAlH_4$.

4. A method such as set forth in claim 1 wherein the catalyst comprises a mixture of $PdCl_2$ and $B_2H_6$.

5. A method such as set forth in claim 1 wherein the catalyst comprises a mixture of $NiCl_2$ and $KBH_4$.

6. A method such as set forth in claim 1 wherein the catalyst comprises a mixture of $CoCl_2$ and $NaBH_4$.

7. A method such as set forth in claim 1 wherein the substituted acetylene of (b) is propyne.

8. A method such as set forth in claim 1 wherein the substituted acetylene of (b) is propargyl alcohol.

9. A method such as set forth in claim 1 wherein the substituted acetylene of (b) is heptyne-1.

10. A method such as set forth in claim 1 wherein the substituted acetylene of (b) is phenyl acetylene.

11. A method such as set forth in claim 1 wherein the substituted acetylene of (b) is butyne-1.

References Cited by the Examiner

UNITED STATES PATENTS

| | | | |
|---|---|---|---|
| 2,773,053 | 12/56 | Field. | |
| 2,880,200 | 3/56 | Feller et al. | |
| 2,881,156 | 4/59 | Pilar et al. | |
| 2,898,327 | 8/59 | McCulloch | 260—88.2 |
| 2,914,515 | 11/59 | Stuart | 260—88.2 |
| 3,092,613 | 6/63 | Kennerly et al. | 260—88.1 |

FOREIGN PATENTS

| | | |
|---|---|---|
| 215,925 | 7/58 | Australia. |
| 779,111 | 7/57 | Great Britain. |
| 570,538 | 2/59 | Canada. |

OTHER REFERENCES

Gaylord et al.: "Linear and Stereoregular Addition Polymers," pages 219–220 and 510, Interscience Publishers, Inc., New York, 1959, also pages 378–379.

JOSEPH L. SCHOFER, *Primary Examiner*.

M. LIEBMAN, M. STERMAN, J. R. LIBERMAN, *Examiners*.